United States Patent
Kim et al.

(10) Patent No.: US 10,326,126 B2
(45) Date of Patent: Jun. 18, 2019

(54) NEGATIVE ELECTRODE ACTIVE MATERIAL AND METHOD OF PREPARING THE SAME

(71) Applicant: LG Chem, Ltd., Seoul (KR)

(72) Inventors: Hyun Wook Kim, Daejeon (KR); Eun Kyung Kim, Daejeon (KR); Sun Young Shin, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 15/548,969

(22) PCT Filed: Mar. 22, 2016

(86) PCT No.: PCT/KR2016/002861
§ 371 (c)(1),
(2) Date: Aug. 4, 2017

(87) PCT Pub. No.: WO2016/153255
PCT Pub. Date: Sep. 29, 2016

(65) Prior Publication Data
US 2018/0040875 A1     Feb. 8, 2018

(30) Foreign Application Priority Data

Mar. 23, 2015  (KR) ........................ 10-2015-0039933
Mar. 21, 2016  (KR) ........................ 10-2016-0033216

(51) Int. Cl.
*H01M 4/133*     (2010.01)
*H01M 4/04*      (2006.01)
(Continued)

(52) U.S. Cl.
CPC ............. *H01M 4/133* (2013.01); *H01M 4/04* (2013.01); *H01M 4/0404* (2013.01);
(Continued)

(58) Field of Classification Search
CPC .................................................... H01M 4/133
See application file for complete search history.

(56) References Cited

U.S. PATENT DOCUMENTS

| 2002/0076614 A1 | 6/2002 | Yoon et al. |
| 2004/0142238 A1* | 7/2004 | Asahina ............. H01M 2/1077 429/176 |

(Continued)

FOREIGN PATENT DOCUMENTS

| JP | H11329436 A | 11/1999 |
| JP | 2014127275 A | 7/2014 |

(Continued)

OTHER PUBLICATIONS

KR-20140094418-A Translation (Year: 2018).*

(Continued)

*Primary Examiner* — Sarah A. Slifka
*Assistant Examiner* — Brian R Ohara
(74) *Attorney, Agent, or Firm* — Lerner, David, Littenberg, Krumholz & Mentlik, LLP

(57) ABSTRACT

Provided are a negative electrode active material and a method of preparing the same, and particularly, the present invention relates to a negative electrode active material including a core including natural graphite, and a shell surrounding the core and including a roughened amorphous carbon layer.

Since the negative electrode active material according to the present invention has a roughened surface, adhesion may be improved by using a less amount of a binder due to an anchoring effect in which curved surfaces of active material particles in contact with each other are anchored. Thus, an increase in resistance due to the use of an excessive amount of the binder may be prevented while achieving high loading in a negative electrode.

(Continued)

Also, since a specific surface area is increased due to the roughened surface, access of lithium ions becomes easy, and thus, high output of a battery may be obtained.

18 Claims, 6 Drawing Sheets

(51) Int. Cl.
*H01M 4/36* (2006.01)
*H01M 4/587* (2010.01)
*H01M 4/62* (2006.01)
*H01M 4/1393* (2010.01)

(52) U.S. Cl.
CPC ........... *H01M 4/366* (2013.01); *H01M 4/587* (2013.01); *H01M 4/625* (2013.01); *H01M 4/1393* (2013.01); *H01M 4/621* (2013.01)

(56) References Cited

U.S. PATENT DOCUMENTS

| | | | |
|---|---|---|---|
| 2013/0071722 A1* | 3/2013 | Yuasa | .................... H01M 4/64 429/158 |
| 2014/0002960 A1 | 1/2014 | Tezuka et al. | |

FOREIGN PATENT DOCUMENTS

| | | | | |
|---|---|---|---|---|
| KR | 20020057347 A | 7/2002 | | |
| KR | 20080039035 A | 5/2008 | | |
| KR | 20140016899 A | 2/2014 | | |
| KR | 20140082265 A | 7/2014 | | |
| KR | 20140093877 A | 7/2014 | | |
| KR | 20140094418 A | * | 7/2014 | .............. H01M 4/58 |
| KR | 20140094418 A | 7/2014 | | |

OTHER PUBLICATIONS

Bishal Bhattarai, Evolution of amorphous carbon across densities, 2018 Elsevier (Year: 2018).*
International Search Report From PCT/KR2016/002861 dated Jun. 30, 2016.

* cited by examiner (a) (b)

NEGATIVE ELECTRODE ACTIVE MATERIAL AND METHOD OF PREPARING THE SAME

CROSS-REFERENCE TO RELATED APPLICATION

The application is a national phase entry under 35 U.S.C. § 371 of International Application No. PCT/KR2016/002861, filed Mar. 22, 2016, which claims priority to Korean Patent Application No. 10-2015-0039933, filed Mar. 23, 2015 and Korean Patent Application No. 10-2016-0033216, filed Mar. 21, 2016, the disclosures of which are incorporated herein by reference.

Technical Field

The present invention relates to a negative electrode active material and a method of preparing the same.

Background Art

Requirements for the use of alternative energy or clean energy have increased due to the rapid increase in the use of fossil fuels, and, as a part of this trend, power generation and electricity storage using an electrochemical reaction are the most actively researched areas.

Currently, a typical example of an electrochemical device using the electrochemical energy may be a secondary battery and there is a trend that its usage area is expanding more and more. In recent years, demand for secondary batteries as an energy source has been significantly increased as technology development and demand with respect to portable devices, such as portable computers, mobile phones, and cameras, have increased. Among these secondary batteries, lithium secondary batteries having high energy density, high operating potential, long cycle life, and low self-discharging rate have been subjected to considerable research and have been commercialized and widely used.

Also, in line with growing concerns about environmental issues, a significant amount of research into electric vehicles and hybrid electric vehicles, which may replace vehicles using fossil fuels, such as gasoline vehicle and diesel vehicle, one of major causes of air pollution, has been conducted. Nickel-metal hydride secondary batteries have been mainly used as power sources of the electric vehicles and hybrid electric vehicles. However, research into the use of lithium secondary batteries having high energy density and discharge voltage has been actively conducted and some of the research are in a commercialization stage.

A typical lithium secondary battery uses graphite as a negative electrode active material, and charge and discharge of the lithium secondary battery is performed while a process of intercalating and deintercalating lithium ions from a positive electrode into and out of a negative electrode is repeated. Although there is a difference in theoretical capacity of the battery according to the type of electrode active materials, charge and discharge capacities may be generally reduced as cycles proceed.

Patent Document 1 discloses a negative electrode for a lithium secondary battery, a method of preparing the same, and a lithium secondary battery including the negative electrode, as a prior art related to a negative electrode active material. Specifically, Patent Document 1 provided a negative electrode for a lithium secondary battery including a current collector and a negative electrode active material layer formed on the current collector, wherein the negative electrode active material layer includes a carbon-based negative electrode active material and a polyacrylate binder, and a weight ratio of the polyacrylate binder to the carbon-based negative electrode active material is in a range of 0.01 to 0.4, a method of preparing the same, and a lithium secondary battery including the negative electrode.

However, since an excessive amount of a binder is used in a conventional negative electrode as described above, resistance of the electrode may be increased.

Therefore, there is a need to develop a negative electrode active material which may reduce the resistance while increasing adhesion during the preparation of the electrode.

PRIOR ART DOCUMENT

Korean Patent Application Publication No. 10-2014-0093877

DISCLOSURE OF THE INVENTION

Technical Problem

An aspect of the present invention provides a negative electrode active material which may prepare an electrode having improved adhesion while using a less amount of a binder.

Another aspect of the present invention provides a method of preparing the negative electrode active material.

Another aspect of the present invention provides a negative electrode including the negative electrode active material.

Another aspect of the present invention provides a secondary battery including the negative electrode, and a battery module and a battery pack which include the secondary battery.

Technical Solution

According to an aspect of the present invention, there is provided a negative electrode active material in which adhesion of a surface is improved by including: a core including natural graphite; and a shell including a roughened amorphous carbon layer which is formed on a surface of the core.

According to another aspect of the present invention, there is provided a method of preparing a negative electrode active material including the steps of: forming an amorphous carbon layer on a surface of natural graphite (step 1); and roughening a surface of the amorphous carbon layer of step 1 by mechanical processing (step 2).

According to another aspect of the present invention, there is provided a negative electrode including: a current collector; and a negative electrode material mixture layer including the negative electrode active material which is formed on the current collector.

According to another aspect of the present invention, there is provided a secondary battery, a battery module, and a battery pack which include the negative electrode, a positive electrode coated with a positive electrode material mixture including a positive electrode active material, and an electrolyte solution.

Advantageous Effects

Since a negative electrode active material according to the present invention has a roughened surface, an adhesion improvement effect may be achieved by using a less amount of a binder due to an anchoring effect in which curved surfaces of active material particles in contact with each other are anchored. Thus, an increase in resistance may be prevented due to the use of a small amount of the binder while achieving high loading in a negative electrode.

Furthermore, since a specific surface area of the negative electrode active material according to the present invention is increased due to the roughened surface, access of lithium ions becomes easy, and thus, high output of a battery may be obtained.

DESCRIPTION OF THE SYMBOLS

Figure 1:
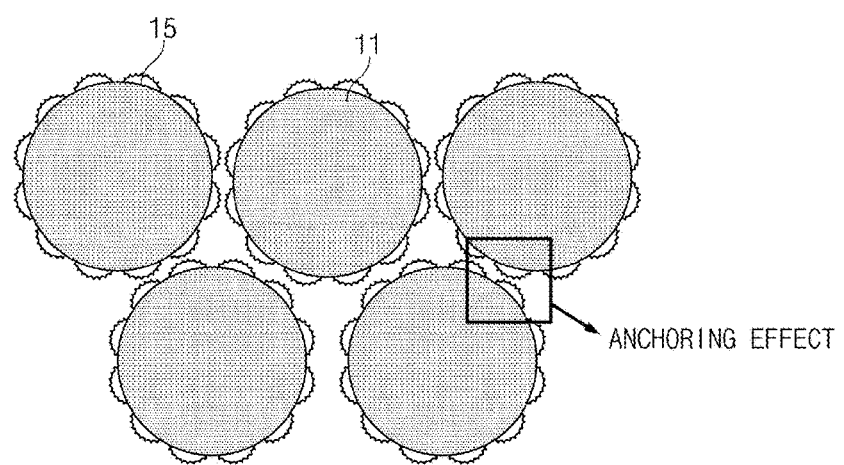
FIG. 1 is a schematic view illustrating a shape of a negative electrode active material according to an embodiment of the present invention.

11: Core
13: Amorphous carbon layer
15: Amorphous carbon layer having roughened surface

MODE FOR CARRYING OUT THE INVENTION

Hereinafter, the present invention will be described in more detail to allow for a clearer understanding of the present invention.

It will be understood that words or terms used in the specification and claims shall not be interpreted as the meaning defined in commonly used dictionaries. It will be further understood that the words or terms should interpreted as having a meaning that is consistent with their meaning in the context of the relevant art and the technical idea of the invention, based on the principle that an inventor may properly define the meaning of the words or terms to best explain the invention.

The terminology used herein is for the purpose of describing particular example embodiments only and is not intended to be limiting of the present invention. In the specification, the terms a singular form may include plural forms unless referred to the contrary.

It will be further understood that the terms "include," "comprise," or "have" when used in this specification, specify the presence of stated features, numbers, steps, elements, or combinations thereof, but do not preclude the presence or addition of one or more other features, numbers, steps, elements, or combinations thereof.

Most conventional materials used as a graphite-based negative electrode active material of a secondary battery were spheronized natural graphite having a surface coated with amorphous carbon. However, there was a limitation in that adhesion may be reduced as high loading in a negative electrode was in progress, and if the amount of a binder was increased to address the limitation, a side effect of increasing resistance occurred.

Thus, the present invention attempts to provide a negative electrode active material which may simultaneously achieve high loading in a negative electrode, excellent adhesion, and high output.

Specifically, according to an embodiment of the present invention, provided is a negative electrode active material including:

a core including natural graphite; and a shell including a roughened amorphous carbon layer which is formed on a surface of the core.

Hereinafter, the negative electrode active material according to the present invention will be described in detail.

In the negative electrode active material of the present invention, the core may have a spherical shape having an average particle diameter ($D_{50}$) of 1 μm to 20 μm and an aspect ratio (length of major axis/length of minor axis) of to 1.5 (in this case, the average particle diameter ($D_{50}$) denotes a particle diameter corresponding to 50 vol % in a cumulative volume distribution).

The core may include natural graphite. Typically, a crystalline graphite material is mainly used as a negative electrode active material of a secondary battery, and the natural graphite corresponds to crystalline graphite. The natural graphite included in the core may have a spherical shape in which flaky natural graphite is granulated into a spherical shape.

In a case in which the natural graphite is used as the negative electrode active material, high-rate charge and discharge characteristics and cycle life characteristics are poor. Thus, destruction due to an electrolyte may be prevented and an irreversible reaction may be reduced by surrounding a surface of the natural graphite by coating the surface with an appropriate amount of the amorphous carbon layer.

The amorphous carbon layer constituting the shell may be formed by using at least one soft carbon raw material selected from the group consisting of a coal-derived pitch, a petroleum-derived pitch, polyvinyl chloride, a mesophase pitch, a tar, and low molecular weight heavy oil; at least one hard carbon raw material selected from the group consisting of a polyvinyl alcohol resin, a furfuryl alcohol resin, triton, citric acid, stearic acid, sucrose, polyvinylidene fluoride, carboxymethyl cellulose, hydroxypropyl cellulose, regenerated cellulose, polyvinylpyrrolidone, polyethylene, polypropylene, an ethylene-propylene-diene monomer (EPDM), poly acrylic acid, sodium polyacrylate, polyacrylonitrile, glucose, gelatin, saccharides, a phenolic resin, a naphthalene resin, a polyamide resin, a furan resin, a polyimide resin, a cellulose resin, a styrene resin, an epoxy resin, and a vinyl chloride resin; or a precursor combination thereof. In particular, an amorphous carbon layer prepared by using the phenolic resin and the naphthalene resin may be used because roughening may be easy and the anchoring effect may be further maximized.

The amorphous carbon layer may be included in an amount of about 2 wt % to about 5 wt % based on the total weight of the negative electrode active material. In a case in which the amorphous carbon layer is included in an amount of less than 2 wt % based on the total weight of the negative electrode active material, since the amorphous carbon layer is excessively thin, the natural graphite, as the core, may be destructed by the electrolyte or the core may also be roughened. In a case in which the amorphous carbon layer is included in an amount of greater than 5 wt %, access of lithium ions may be difficult due to an increase in a thickness of the shell.

The weight of the amorphous carbon layer may be measured by thermogravimetric analysis (TGA).

For example, since mass loss temperature ranges of the low crystalline coating layer and the crystalline core are different when mass loss is measured by TGA while increasing the temperature at a rate of 4° C./min, a coating amount may be measured by a weight ratio.

In the negative electrode active material of the present invention, the shell including the roughened amorphous carbon layer may have a thickness of 0.01 µm to 0.5 µm.

Also, the negative electrode active material of the present invention may have a spherical shape having an average diameter ($D_{50}$) of 5 µm to 22 µm and an aspect ratio (length of major axis/length of minor axis) of 1 to 1.5.

As illustrated in FIG. 1, since the surface of the amorphous carbon layer surrounding a core 11 of the negative electrode active material of the present invention is roughened 15 to generate an anchoring effect in which curved surfaces of active material particles in contact with each other are anchored, adhesion may be improved by using a less amount of a binder. Thus, the high loading in the negative electrode may be achieved and simultaneously, a limitation may be addressed in which resistance is increased due to the use of an excessive amount of the binder. Also, since a specific surface area of the negative electrode active material is increased due to the roughened surface of the shell, the access of the lithium ions becomes easy, and thus, high output of the battery may be obtained.

In this case, the roughened amorphous carbon layer may have a surface roughness (Ra) of 0.01 µm to 5 µm. In a case in which the surface roughness of the amorphous carbon layer is less than 0.01 µm, the improvement of the adhesion may be insignificant, and, in a case in which the surface roughness of the amorphous carbon layer is greater than 5 µm, since the thickness of a portion of the shell may be decreased, the core may be destructed by the electrolyte.

Specifically, the roughened amorphous carbon layer may include a first rough surface having a surface roughness (Ra) of 1 µm to 5 µm and a second rough surface having a surface roughness of 0.01 µm to 1 µm on the first rough surface.

A sum of areas above and under a center line over a measuring length (reference length) is measured, and the surface roughness is a value (arithmetic mean roughness) obtained by dividing the measured value by the measuring length.

The first rough surface having a larger roughness exhibits the anchoring effect, in which the surfaces of the active material particles in contact with each other are anchored, so that there is an effect of increasing a loading ratio of the active material while using a less amount of the binder, and the second rough surface having a smaller roughness on the first rough surface has an effect of increasing the surface area of the negative electrode active material. Thus, when the negative electrode active material of the present invention having both the first rough surface and the second rough surface is used, a negative electrode having high adhesion and excellent output as well as a high loading ratio may be prepared.

The roughened amorphous carbon layer may have a specific surface area which is improved by 1.5 times to 2.0 times in comparison to a specific surface area of the amorphous carbon layer before roughened. In a case in which the roughened amorphous carbon layer has a specific surface area of less than 1.5 times the specific surface area of the amorphous carbon layer before roughened, since a desired anchoring effect is insignificant, the improvement of the adhesion is insignificant. In a case in which the roughened amorphous carbon layer has a specific surface area of greater than 2.0 times the specific surface area of the amorphous carbon layer before roughened, since the specific surface area is excessively increased, initial efficiency and capacity may be reduced.

Also, according to an embodiment of the present invention, provided is a method of preparing a negative electrode active material including the steps of:

forming an amorphous carbon layer on a surface of natural graphite (step 1); and roughening a surface of the amorphous carbon layer of step 1 by mechanical processing (step 2).

Figure 2:
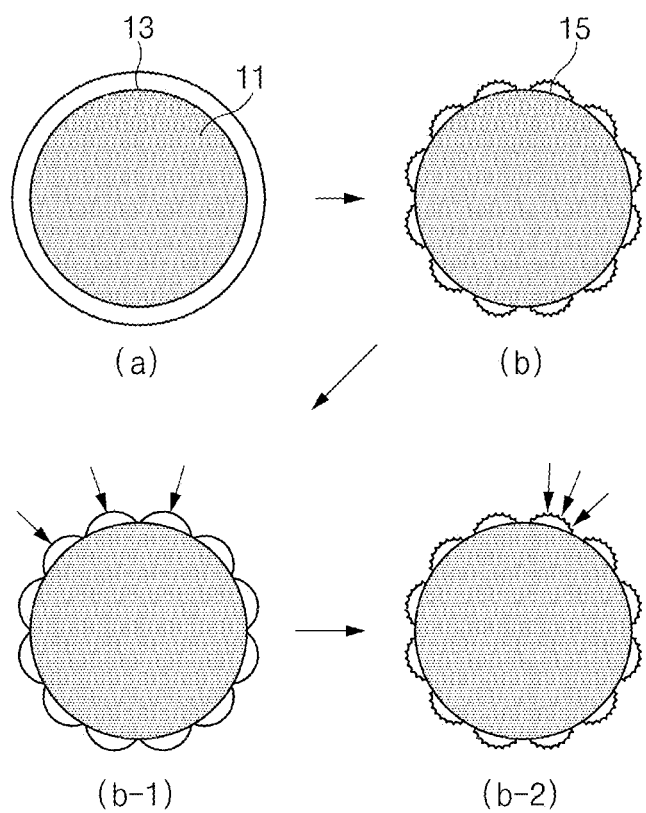
FIG. 2 is a schematic view illustrating a method of preparing a negative electrode active material according to an embodiment of the present invention.

Hereinafter, the method of preparing a negative electrode active material according to the present invention will be described in detail for each step with reference to FIG. 2.

In the method of preparing a negative electrode active material according to the present invention, step 1 is a step of forming an amorphous carbon layer 13 on a surface of a core that is formed of natural graphite (a).

It is favorable for the mechanical processing as a subsequent process that step 1 is performed by a method of coating the surface of the natural graphite with amorphous carbon by mixing the solid-phase amorphous carbon with the natural graphite. Specifically, step 1 may be performed by a coating method in which a solid pitch and natural graphite are rotated together in a drum mixer. However, the present invention is not limited to the above method, and a conventional preparation method may be used in which natural graphite, an amorphous carbon precursor, and a solvent are mixed and coating is then performed by drying and a heat treatment.

Figure 6:
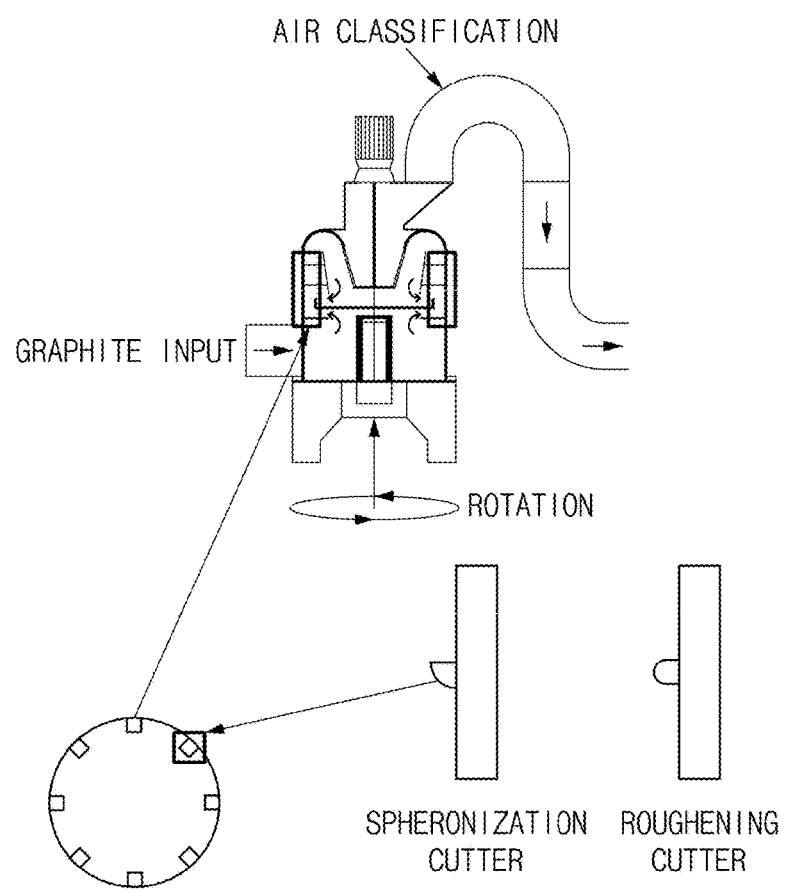
FIG. 6 is a schematic view illustrating spheronization equipment according to an embodiment of the present invention.

The natural graphite used may have a spherical shape having an average diameter ($D_{50}$) of 1 µm to 20 µm and an aspect ratio (length of major axis/length of minor axis) of 1 to 1.5. As illustrated in FIG. 6, the natural graphite may be spheronized by being curled in a spherical shape and being cut by using semicircular spheronization cutter of spheronization equipment.

The amorphous carbon layer may have a thickness of 0.01 µm to 5 µm, and a precursor of the amorphous carbon layer may include at least one soft carbon raw material selected from the group consisting of a coal-derived pitch, a petroleum-derived pitch, polyvinyl chloride, a mesophase pitch, a tar, and low molecular weight heavy oil; at least one hard carbon raw material selected from the group consisting of a polyvinyl alcohol resin, a furfuryl alcohol resin, triton, citric acid, stearic acid, sucrose, polyvinylidene fluoride, carboxymethyl cellulose, hydroxypropyl cellulose, regenerated cellulose, polyvinylpyrrolidone, polyethylene, polypropylene, an ethylene-propylene-diene monomer (EPDM), poly acrylic acid, sodium polyacrylate, polyacrylonitrile, glucose, gelatin, saccharides, a phenolic resin, a naphthalene resin, a polyamide resin, a furan resin, a polyimide resin, a cellulose resin, a styrene resin, an epoxy resin, and a vinyl chloride resin; or a combination thereof. In particular, an amorphous carbon layer prepared by using the phenolic resin and the naphthalene resin may be used because roughening may be easy and the anchoring effect may be further maximized.

In this case, the solvent mixed with the amorphous precursor may include water, N-methylpyrrolidone, dimethylformamide, toluene, ethylene, dimethylacetamide, acetone, methyl ethyl ketone, hexane, tetrahydrofuran, decane, ethanol, methanol, isopropanol, ethyl acetate, or a combination thereof.

In this case, the amorphous carbon layer may be included in an amount of 2 wt % to 5 wt % based on the total negative electrode active material. In a case in which the amorphous carbon layer is included in an amount of less than 2 wt % based on the total negative electrode active material, since the amorphous carbon layer is excessively thin, the natural graphite, as the core, may be destructed by the electrolyte or the natural graphite may also be roughened. In a case in which the amorphous carbon layer is included in an amount of greater than 5 wt %, the access of lithium ions may be difficult.

Also, in the method of preparing a negative electrode active material according to the present invention, step 2 is a step of roughening a surface of the amorphous carbon layer of step 1 by mechanical processing (b).

In step 2, the surface of the negative electrode active material is roughened 15 by mechanical processing of the surface of the amorphous carbon layer 13 surrounding the surface of the core 11 prepared in step 1 to form irregularities, and adhesion of the negative electrode active material having the roughened surface may be improved due to the anchoring effect, in which the curved surfaces of the active material particles in contact with each other are anchored, while using a less amount of the binder and an effect of increasing the specific surface area may be obtained.

The mechanical processing of step 2 may be performed by the spheronization equipment illustrated in FIG. 6 which is used in step 1. As described above, the spheronization equipment may be originally used to spheronize a specific material by using the semicircular spheronization cutter, but, in the present invention, for the roughening of the surface of the material, a curved shape with irregularities may be prepared, without cutting of the surface of the amorphous carbon layer, by using a needle-shaped roughening cutter instead of the spheronization cutter as illustrated in FIG. 6. However, the mechanical processing of step 2 is not necessarily performed only by the spheronization equipment, but a mechanical processing method capable of roughening the surface of the amorphous carbon layer may be appropriately selected and used.

In the method of the present invention, two types of roughening cutters having different shapes and sizes may be used for the roughening. That is, the anchoring effect may be achieved in such a manner that a first roughening cutter having a larger area is used to allow spherical graphite to have a largely irregular shape (b-1), and a second roughening cutter having a smaller area is then used to reduce the irregular shape (b-2).

Specifically, the first rough surface may be formed by using the first roughening cutter having a diameter of 10 μm which is operated at a speed of 500 rpm, and the second rough surface may then be formed by using the second roughening cutter having a diameter of 2 μm which is operated at a speed of 200 rpm.

As a result, the amorphous carbon layer may be mechanically processed so as to have a surface roughness (Ra) of 0.01 μm to 5 μm. In a case in which the surface roughness of the amorphous carbon layer is less than 0.01 μm, the improvement of the adhesion may be insignificant, and, in a case in which the surface roughness of the amorphous carbon layer is greater than 5 μm, the natural graphite may be destructed by the electrolyte.

Specifically, the amorphous carbon layer may be mechanically processed so as to have the first rough surface having a surface roughness (Ra) of 1 μm to 5 μm on the surface of the amorphous carbon layer and the second rough surface having a surface roughness of 0.01 μm to 1 μm on the first rough surface.

The first rough surface having a larger roughness exhibits the anchoring effect, in which the surfaces of the active material particles in contact with each other are anchored, so that there is an effect of increasing a loading ratio of the active material while using a less amount of the binder, and the second rough surface having a smaller roughness on the first rough surface has an effect of increasing the surface area of the negative electrode active material. Thus, when the negative electrode active material of the present invention having both the first rough surface and the second rough surface is used, a negative electrode having high adhesion and excellent output as well as a high loading ratio may be prepared.

The roughened amorphous carbon layer may have a specific surface area which is improved by 1.5 times to 2.0 times in comparison to a specific surface area of the amorphous carbon layer before roughened. In a case in which the roughened amorphous carbon layer has a specific surface area of less than 1.5 times the specific surface area of the amorphous carbon layer before roughened, since a desired anchoring effect is not obtained, the improvement of the adhesion is insignificant. In a case in which the roughened amorphous carbon layer has a specific surface area of greater than 2.0 times the specific surface area of the amorphous carbon layer before roughened, since the specific surface area is excessively increased, initial efficiency and capacity may be reduced.

Also, according to another embodiment of the present invention, provided is a negative electrode including:

a current collector; and a negative electrode material mixture layer including the negative electrode active material which is formed on the current collector.

A negative electrode collector is coated with a slurry which is prepared by mixing an organic solvent with a negative electrode material mixture including the negative electrode active material of the present invention, and the negative electrode may be prepared by drying and rolling the coated collector.

When the roughened negative electrode active material according to the present invention is used, since the anchoring effect between the particles may occur, adhesive strength of the electrode may increase for the same amount of the binder, and thus, an increase in the resistance of the secondary battery due to the use of an excessive amount of the binder may be prevented while achieving the high loading in the negative electrode. Also, since the specific surface area may be increased due to the roughened surface, the access of lithium ions becomes easy, and thus, a high power secondary battery may be obtained.

Furthermore, the present invention provides a secondary battery including:

the negative electrode, a positive electrode coated with a positive electrode material mixture including a positive electrode active material, and an electrolyte solution.

Although the positive electrode active material of the secondary battery is not particularly limited, a lithium transition metal oxide may be particularly used. Examples of the lithium transition metal oxide may be Li.Co-based composite oxides such as $LiCoO_2$, Li.Ni.Co.Mn-based composite oxides such as $LiNi_xCo_yMn_zO_2$, Li.Ni-based composite oxides such as $LiNiO_2$, and Li.Mn-based composite oxides such as $LiMn_2O_4$, and these oxides may be used alone or in a mixture thereof.

The positive electrode material mixture and the negative electrode material mixture may include a conductive agent. Any conductive agent may be used without particular limitation as long as it has suitable conductivity without causing adverse chemical changes in the battery, and, conductive materials, for example, graphite; carbon black such as acetylene black, Ketjen black, channel black, furnace black, lamp black, and thermal black; conductive fibers such as carbon fibers or metal fibers; carbon fluoride and metal powder such as aluminum and nickel powders; conductive whiskers such as zinc oxide whiskers and potassium titanate whiskers; conductive metal oxides such as titanium oxide; or polyphenylene derivatives, may be used.

In this case, at least one of the negative electrode material mixture and the positive electrode material mixture may include a binder, and polyvinylidene fluoride (PVDF) may be particularly used as the binder.

The positive electrode or the negative electrode may have a configuration in which the current collector is coated with the positive electrode material mixture or the negative electrode material mixture. Any current collector may be used without particular limitation as long as it has conductivity without causing adverse chemical changes in the battery, and, for example, copper, stainless steel, aluminum, nickel, titanium, fired carbon, or aluminum or stainless steel that is surface-treated with one of carbon, nickel, titanium, silver, or the like may be used.

Also, a non-aqueous organic solvent, an organic solid electrolyte, and an inorganic solid electrolyte may be used as the electrolyte solution, i.e., a lithium salt-containing electrolyte solution, but the present invention is not limited thereto.

According to another embodiment of the present invention, a battery module including the secondary battery as a unit cell and a battery pack including the battery module are provided. Since the battery module or the battery pack includes the secondary battery having low resistance as well as high capacity and high output characteristics, the battery module or the battery pack may be used as a power source of any one of medium and large sized devices, for example, a power tool; electric cars including an electric vehicle (EV), a hybrid electric vehicle (HEV), and a plug-in hybrid electric vehicle (PHEV); or a power storage system.

Hereinafter, exemplary embodiments will be described in detail to fully explain the present invention in such a manner that it may easily be carried out by a person with ordinary skill the art to which the present invention pertains. However, the present invention may be modified in various forms and is not limited to the disclosed embodiments.

EXAMPLES

Example 1: Preparation of Secondary Battery Including Roughened Negative Electrode Active Material (Step 1) 1,000 g of natural graphite (product name: SG16) having an average particle diameter ($D_{50}$) of 16 μm and 100 g of a coal tar pitch, as a precursor of an amorphous carbon layer, were mixed in a drum-type mixer for 2 hours, and then heat-treated at 1,150° C. for 600 minutes to prepare natural graphite coated with an amorphous carbon layer (specific surface area of 3.3 $m^2/g$).

The natural graphite coated with an amorphous carbon layer thus prepared was introduced into spheronization equipment (equipment name: AMD3) and was spheronized by using a spheronization cutter under process conditions (time, speed, etc.) consisted of a time of 2 hours and a speed of 1,000 rpm.

(Step 2) The natural graphite coated with the spheronized amorphous carbon layer was introduced into the spheronization equipment, in which the spheronization cutter was replaced by a needle-shaped roughening cutter having a diameter of 10 μm, and was processed at a speed of 500 rpm to form a first rough surface having a surface roughness of 7 μm. Thereafter, the needle-shaped roughening cutter was replaced by a roughening cutter having a diameter of 2 μm and the first rough surface was then processed at a speed of 200 rpm to form a second rough surface having a surface roughness of 3 μm so that a negative electrode active material including the amorphous carbon layer having a roughened surface (specific surface area of 4.1 $m^2/g$) was prepared.

(Step 3) A negative electrode material mixture was prepared by mixing 98 g of the natural graphite coated with the roughened amorphous carbon layer, 1 g of PVDF as a binder, and 1 g of carbon black as a conductive agent. A copper current collector was coated with the negative electrode material mixture, and the coated collector was dried in a vacuum oven at 120° C. and rolled to prepare a negative electrode.

(Step 4) A porous polyethylene separator was disposed between the negative electrode and a positive electrode using $LiNi_{0.6}Mn_{0.2}Co_{0.2}O_2$ as a positive electrode active material, and a lithium electrolyte solution was injected thereinto to prepare a lithium secondary battery.

Comparative Example 1: Preparation of Secondary Battery Including Unroughened Negative Electrode Active Material A negative electrode active material including a core (natural graphite) coated with an amorphous carbon layer (surface roughness of 0), a negative electrode including the negative electrode active material, and a secondary battery including the negative electrode were prepared in the same manner as in Example 1 except that step 2 was not preformed in Example 1.

EXPERIMENTAL EXAMPLES

Experimental Example 1. Observation of Surface of Negative Electrode Active Material The negative electrode active materials prepared in Example 1 and Comparative Example 1 were observed with a scanning electron microscope (SEM), and the results thereof are then presented in FIG. 3.

Figure 3:
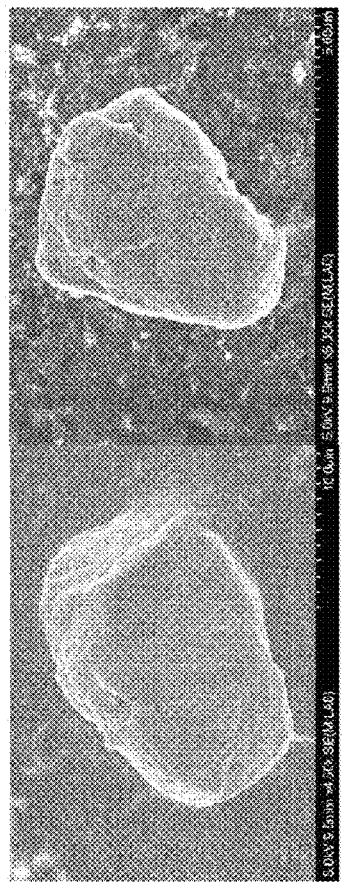
FIG. 3 is scanning electron microscope images of negative electrode active materials prepared in (a) Example 1 and (b) Comparative Example 1.
Figure 3:
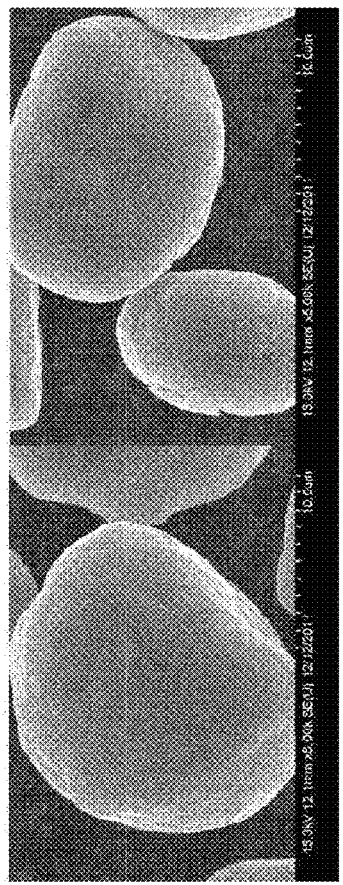

As illustrated in FIG. 3, with respect to (b) the negative electrode active material of Comparative Example 1 which was not roughened, it may be understood that the negative electrode active material of Comparative Example 1 was spherical particles having a smooth overall surface. However, with respect to (a) the negative electrode active material of Example 1 which was roughened, it may be understood that the negative electrode active material of Example 1 was particles having a surface roughness of about 3 μm.

Thus, it may be understood that the negative electrode active material having a roughened surface of the present invention has rough surfaces having heterogeneous roughness. Furthermore, it may be predicted that the anchoring effect may be achieved due to the rough surface having relatively high roughness and a large surface area may be obtained due to the rough surface having relatively low roughness.

Experimental Example 2

In order to investigate adhesive strength of the negative electrodes prepared in Example 1 and Comparative Example 1, adhesion measurement was performed using a generally known 180-degree peel test. The results thereof are presented in FIG. 4.

Figure 4:
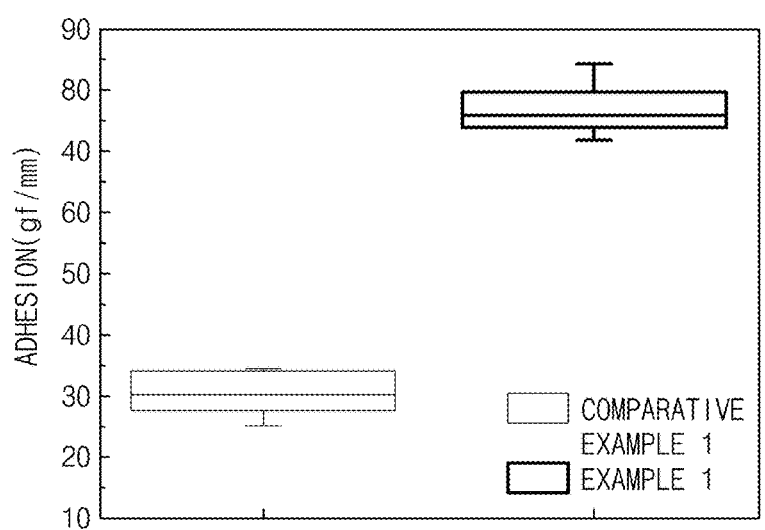
FIG. 4 is a graph illustrating the results of measuring adhesion of negative electrodes prepared in Example 1 and Comparative Example 1.

As illustrated in FIG. 4, adhesion of the negative electrode of Example 1, in which the roughened negative electrode active material was used, was about 75 gf/10 mm, but adhesion of the negative electrode of Comparative Example 1, in which the unroughened negative electrode active material was used, was about 30 gf/10 mm, and thus, it may be understood that the adhesion of the negative electrode of Example 1 of the present invention was higher by about 2.5 times.

From the above results, it may be understood that, even in a case of a negative electrode using the same type and amount of binder, significantly improved adhesion may be obtained when the negative electrode active material having a roughened surface was used, and this may be due to the anchoring effect between roughened negative electrode active material particles.

Experimental Example 3

Figure 5:
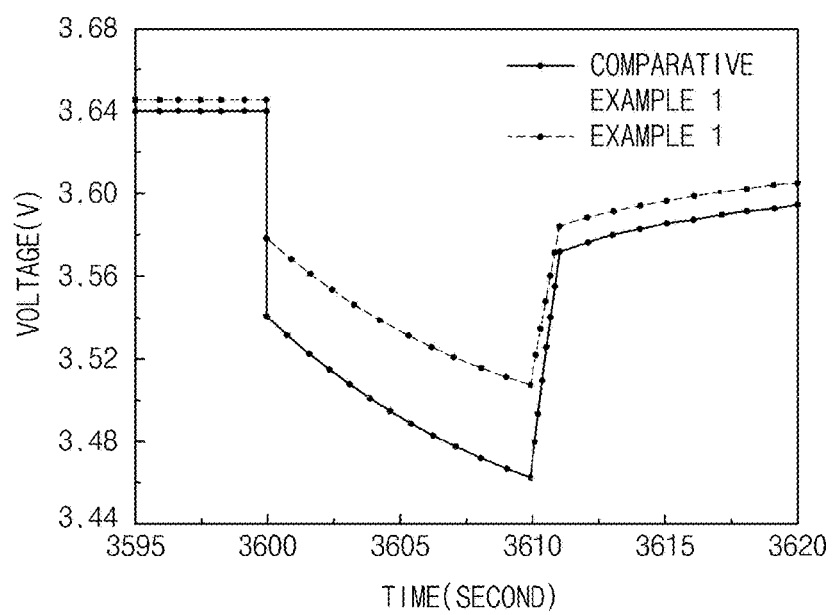
FIG. 5 is a graph illustrating the results of measuring discharge characteristics of secondary batteries prepared in Example 1 and Comparative Example 1.

Continuous discharge characteristics (discharge output value: 160 mW) of the lithium secondary batteries prepared in Example 1 and Comparative Example 1 were measured at 50% state of charge (SOC) and room temperature, and the results thereof are presented in FIG. 5.

As illustrated in FIG. 5, it may be confirmed that voltage characteristics versus time of the secondary battery of Example 1 including the roughened negative electrode active material were better than those of the secondary battery of Comparative Example 1, which was not roughened, at all time intervals.

Thus, it may be understood that since the roughened negative electrode active material had a larger surface area than the unroughened negative electrode active material and, accordingly, the access of lithium ions is easy, a higher power secondary battery may be provided.

Although the exemplary embodiments of the present invention have been described in detail, the scope of the present invention is not limited thereto but various modifications and improvements made by those skilled in the art using the basic concept of the present invention defined in the claims also fall within the scope of the present invention.

The invention claimed is:

1. A negative electrode active material comprising:
   a core including natural graphite; and
   a shell including a roughened amorphous carbon layer which is formed on a surface of the core,
   wherein the roughened amorphous carbon layer comprises a first rough surface having a surface roughness (Ra) of 1 μm to 5 μm and a second rough surface having a surface roughness of 0.01 μm to 1 μm on the first rough surface.

2. The negative electrode active material of claim 1, wherein the natural graphite is spherical.

3. The negative electrode active material of claim 1, wherein the amorphous carbon layer is included in an amount of 2 wt % to 5 wt % based on the total weight of the negative electrode active material.

4. The negative electrode active material of claim 1, wherein the amorphous carbon layer is prepared from at least one soft carbon raw material selected from the group consisting of a coal-derived pitch, a petroleum-derived pitch, polyvinyl chloride, a mesophase pitch, a tar, and low molecular weight heavy oil; at least one hard carbon raw material selected from the group consisting of a polyvinyl alcohol resin, a furfuryl alcohol resin, triton, citric acid, stearic acid, sucrose, polyvinylidene fluoride, carboxymethyl cellulose, hydroxypropyl cellulose, regenerated cellulose, polyvinylpyrrolidone, polyethylene, polypropylene, an ethylene-propylene-diene monomer, poly acrylic acid, sodium polyacrylate, polyacrylonitrile, glucose, gelatin, saccharides, a phenolic resin, a naphthalene resin, a polyamide resin, a furan resin, a polyimide resin, a cellulose resin, a styrene resin, an epoxy resin, and a vinyl chloride resin; or a combination thereof.

5. A method of preparing the negative electrode active material of claim 1, the method comprising steps of:
   forming an amorphous carbon layer on a surface of natural graphite (step 1); and
   roughening a surface of the amorphous carbon layer of step 1 by mechanical processing (step 2).

6. The method of claim 5, wherein the mechanical processing of step 2 is performed by spheronization equipment.

7. The method of claim 6, wherein the spheronization equipment is equipped with a needle-shaped roughening cutter.

8. The method of claim 5, wherein the natural graphite of step 1 is spherical.

9. The method of claim 5, wherein the amorphous carbon layer roughened in step 2 is included in an amount of 2 wt % to 5 wt % based on the total weight of the negative electrode active material.

10. The method of claim 5, wherein the amorphous carbon layer roughened in step 2 has a surface roughness (Ra) of 0.01 μm to 5 μm.

11. The method of claim 5, wherein the amorphous carbon layer roughened in step 2 comprises a first rough surface having a surface roughness (Ra) of 1 μm to 5 μm and a second rough surface having a surface roughness of 0.01 μm to 1 μm on the first rough surface.

12. The method of claim 5, wherein the amorphous carbon layer roughened in step 2 has a specific surface area which is increased by 1.5 times to 2.0 times in comparison to a specific surface area of the amorphous carbon layer before roughened.

13. The method of claim 5, wherein the amorphous carbon layer is prepared from at least one soft carbon raw material selected from the group consisting of a coal-derived pitch, a petroleum-derived pitch, polyvinyl chloride, a mesophase pitch, a tar, and low molecular weight heavy oil; at least one hard carbon raw material selected from the group consisting of a polyvinyl alcohol resin, a furfuryl alcohol resin, triton, citric acid, stearic acid, sucrose, polyvinylidene fluoride, carboxymethyl cellulose, hydroxypropyl cellulose, regenerated cellulose, polyvinylpyrrolidone, polyethylene, polypropylene, an ethylene-propylene-diene monomer, poly acrylic acid, sodium polyacrylate, polyacrylonitrile, glucose, gelatin, saccharides, a phenolic resin, a naphthalene resin, a polyamide resin, a furan resin, a polyimide resin, a cellulose resin, a styrene resin, an epoxy resin, and a vinyl chloride resin; or a combination thereof.

14. A negative electrode comprising:
an electrode collector; and
a negative electrode material mixture layer including the negative electrode active material of claim 1 which is formed on the electrode collector.

15. A secondary battery comprising:
the negative electrode of claim 14;
a positive electrode coated with a positive electrode material mixture including a positive electrode active material;
a separator disposed between the negative electrode and the positive electrode; and
an electrolyte solution.

16. A battery module comprising the secondary battery of claim 15 as a unit cell.

17. A battery pack comprising the battery module of claim 16 and used as a power source of a medium and large sized device.

18. The battery pack of claim 17, wherein the medium and large sized device is selected from the group consisting of an electric vehicle, a hybrid electric vehicle, a plug-in hybrid electric vehicle, and a power storage system.

* * * * *